(No Model.)
J. W. SMITH.
SHAFT BEARING.
No. 595,214.   Patented Dec. 7, 1897.
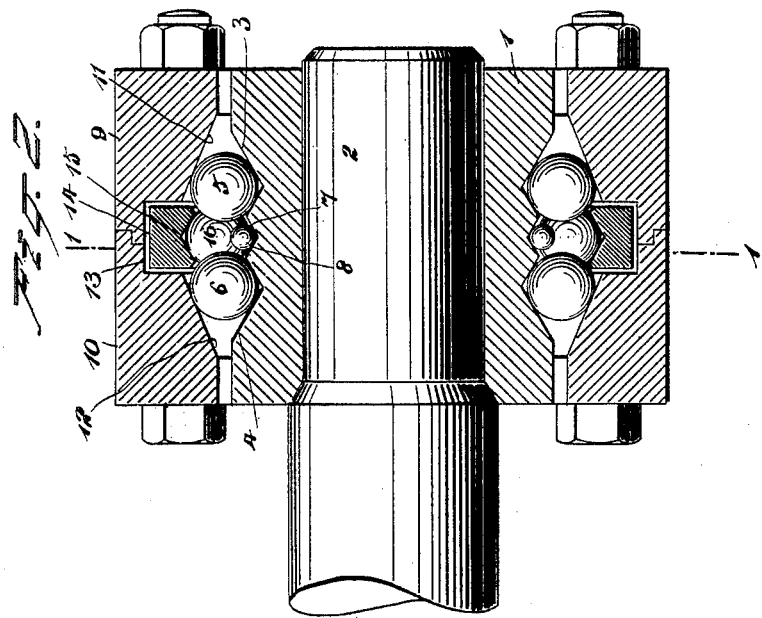
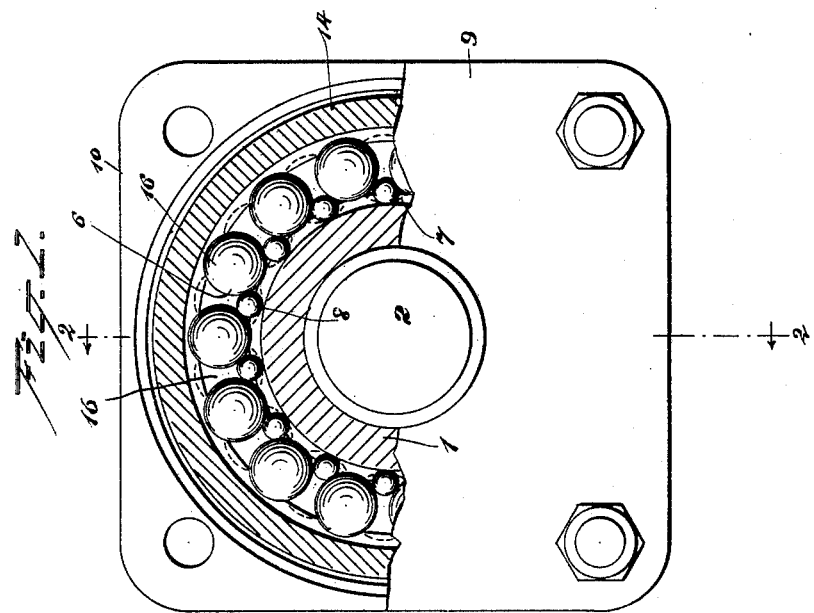
WITNESSES:
Henry T. Hirsch.
C. R. Ferguson
INVENTOR
John W. Smith
BY
Munn & Co
ATTORNEYS.
THE NORRIS PETERS CO., PHOTO-LITHO., WASHINGTON, D. C.

UNITED STATES PATENT OFFICE.

JOHN W. SMITH, OF COLUMBIA, FLORIDA, ASSIGNOR TO HIMSELF AND GEORGE L. DREW, OF SAME PLACE.

SHAFT-BEARING.

SPECIFICATION forming part of Letters Patent No. 595,214, dated December 7, 1897.

Application filed October 26, 1896. Serial No. 610,098. (No model.)

*To all whom it may concern:*

Be it known that I, JOHN W. SMITH, of Columbia, in the county of Columbia and State of Florida, have invented a new and Improved Shaft-Bearing, of which the following is a full, clear, and exact description.

This invention relates to improvements in ball-bearings placed between two parts, one of which is designed to rotate relatively to the other; and the object is to provide a device of this character of simple and comparatively inexpensive construction and with which, when operated, frictional contact is reduced to a minimum.

I will describe a shaft-bearing embodying my invention, and then point out the novel features in the appended claims.

Reference is to be had to the accompanying drawings, forming a part of this specification, in which similar characters of reference indicate corresponding parts in both views.

Figure 1 is a partial plan and partial section on the line 1 1 of Fig. 2, and Fig. 2 is a section on the line 2 2 of Fig. 1.

The invention, as here shown, comprises a journal 1, mounted on a spindle or shaft 2, and provided with annular peripheral channels 3 4, within which are seated the two series of main bearing-balls 5 6, and between the channels 3 4 is a shallow annular channel 7, within which are engaged small interposing balls 8. The channels 3, 4, and 7 will preferably be substantially V-shaped in cross-section, so that the bearing-surface on the balls will be reduced to a very small area, thus producing but little friction.

Surrounding the journal and the balls is a ring or housing, here shown as consisting of two sections 9 10, secured together by means of bolts; but it is obvious that the sections may be otherwise secured together without departing from the spirit of my invention, and it will be further understood that the two sections constitute in effect a single ring or housing. This ring or housing is provided on its inner side with two transversely-inclined planes 11 12, the incline being from an intermediate portion of the ring or housing outward and toward the axis of the journal. The balls 5 and 6 bear against these inclined planes 11 and 12, and therefore serve to wholly sustain the pressure between the journal and the ring or housing.

The ring or housing is provided between the inclined planes with an interior annular groove 13, within which is loosely seated a ring 14, having an interior channel 15, which, like the other channels, is substantially V-shaped in cross-section.

Mounted to travel in the channel 15 is a series of large interposing balls 16, which bear upon and alternate with the main bearing-balls 5 and 6, and also bear upon and alternate with the small interposing balls 8.

In operation the large interposing balls with the ring rotate in opposite directions to that of the main bearing-balls, and as the said interposing balls separate the main bearing-balls it will be seen that there is no frictional bearing between the main bearing-balls, and that the small balls serve to center the large interposing balls with relation to the bearing-balls.

The drawings show the journal as adapted to rotate relatively to the ring or housing; but it is obvious that the journal may be fixed and the ring or housing rotated relatively thereto.

Having thus described my invention, I claim as new and desire to secure by Letters Patent—

1. A shaft-bearing, comprising a journal and a ring or housing, one adapted to rotate relatively to the other, the said journal having peripheral annular channels and the ring or housing having transversely-inclined planes, main bearing-balls engaging in the channels and against the inclined planes, a channeled ring loosely seated in a groove in the ring or housing, interposing balls movable in the ring-channel and engaging with the main bearing-balls, and small interposing balls serving to separate the first-named interposing balls, substantially as specified.

2. A shaft-bearing, comprising a journal having peripheral annular channels for said bearing-balls, a ring or housing having transversely-inclined planes, main bearing-balls engaging in said channels and against the inclined planes, a loose ring having an annular channel, large interposing balls movable in said channel and bearing against the main bearing-balls, and small interposing balls movable in a channel and serving to separate the large interposing balls, substantially as specified.

3. In a ball-bearing comprising a shaft having two ball-races in close proximity to each other, a boxing through which said shaft passes and having a race opposite each of the races on the shaft, a row of balls between each of the two races, a third row of balls between the aforesaid row of balls and in engagement with both of said rows, and a ring held loosely in the boxing and inclosing the third row of balls, having an inner concave surface adapted to fit the surface of the balls of the third row, substantially as described.

JOHN W. SMITH.

Witnesses:
E. J. BERRY,
FRANK DREW.